US012670889B1

(12) United States Patent
Daigre

(10) Patent No.: US 12,670,889 B1
(45) Date of Patent: Jun. 30, 2026

(54) GUITAR CHORD DECODER

(71) Applicant: Jerome Earl Daigre, Roseville, CA (US)

(72) Inventor: Jerome Earl Daigre, Roseville, CA (US)

(*) Notice: Subject to any disclaimer, the term of this patent is extended or adjusted under 35 U.S.C. 154(b) by 240 days.

(21) Appl. No.: 18/544,067

(22) Filed: Dec. 18, 2023

Related U.S. Application Data

(60) Provisional application No. 63/433,428, filed on Dec. 17, 2022.

(51) Int. Cl.
*G10H 1/00* (2006.01)

(52) U.S. Cl.
CPC ................................ *G10H 1/0008* (2013.01)

(58) Field of Classification Search
USPC ........................................................ 84/470
See application file for complete search history.

(56) References Cited

U.S. PATENT DOCUMENTS

| | | | | | |
|---|---|---|---|---|---|
| 3,748,947 | A * | 7/1973 | Freiheit | G09B 15/006 84/471 SR | |
| 5,029,507 | A * | 7/1991 | Bezeau, Jr. | G10G 1/02 84/485 SR | |
| 7,084,340 | B2 * | 8/2006 | Tan | G09B 15/06 84/477 R | |
| 10,013,961 | B1 * | 7/2018 | Campbell | G10G 1/02 | |
| 11,862,032 | B1 * | 1/2024 | Nelson | G09B 15/004 | |
| 2010/0176187 | A1 * | 7/2010 | Shaboo | B65D 5/029 229/110 | |
| 2014/0260898 | A1 * | 9/2014 | Bales | G09B 15/003 84/479 A | |
| 2023/0112378 | A1 * | 4/2023 | Fitzhugh | A47G 33/08 335/285 | |

FOREIGN PATENT DOCUMENTS

CN 2065938 U * 11/1990

OTHER PUBLICATIONS

N. Iino, S. Nishimura, T. Nishimura, K. Fukuda and H. Takeda, "The Guitar Rendition Ontology for Teaching and Learning Support," 2019 IEEE 13th International Conference on Semantic Computing (ICSC), Newport Beach, CA, USA, 2019, pp. 404-411, doi: 10.1109/ICOSC.2019.8665532 (Year: 2019).*

Machine translation of Application CN_2065938 Clarivate Analytics/ PE2E Search (Espacenet Machine Translation unavailable) (Year: 1990).*

Y. Zhao, L. Qiu, W. Ai, F. Shi, and S.-C. Zhu, 'Vertical-Horizontal Structured Attention for Generating Music with Chords', arXiv [cs.SD]. 2020. (Year: 2020).*

* cited by examiner

*Primary Examiner* — Eduardo Castilho

(74) *Attorney, Agent, or Firm* — Plager Schack LLP; Mark H. Plager; Naomi Mann

(57) ABSTRACT

A system for assisting a user in identifying and/or creating chords for a musical instrument such as a guitar comprises a chord decoder device including a root note row including a vertical listing of multiple alphabetic designators representing root notes, and interval relationship rows comprising a vertical listing of root notes in interval relationship for different chords.

7 Claims, 4 Drawing Sheets

GUITAR CHORD DECODER

RELATED APPLICATION

This application claims benefit to U.S. Application No. 63/433,428 filed Dec. 17, 2022, which is incorporated by reference herein in its entirety.

BACKGROUND

The present disclosure relates generally to a guitar chord system.

A guitar chord is a combination of three or more notes that are played together simultaneously using a guitar. Numerous examples of guitar chords in every key may be found in books or charts. However, having to continually refer to books or charts for chord creation may be burdensome and tedious for most guitar players. As such, there is a need for an improved system that assists a user in understanding and creating guitar chords.

SUMMARY

A system for assisting a user in identifying and/or creating chords for a musical instrument, the musical instrument including multiple sound producing elements which are each associated with a root note, the system comprising providing a chord decoder device, the chord decoder device comprising: a root note row including a vertical listing of multiple alphabetic designators, wherein each of the alphabetic designators represents a root note associated with a different one of the multiple sound producing elements, a first interval relationship row adjacent to the root note row, the first vertical interval relationship row comprising a vertical listing of root notes in interval relationship for a first chord; a second interval relationship row adjacent to the first interval relationship row, the second interval relationship row comprising a vertical listing of root notes in interval relationship for a second chord; a third interval relationship row adjacent to the second interval relationship row, the third interval relationship row comprising a vertical listing of root notes in interval relationship for a third chord; a fourth interval relationship row adjacent to the third interval relationship row, the fourth interval relationship row comprising a vertical listing of root notes in interval relationship for a fourth chord; and a fifth interval relationship row adjacent to the fourth interval relationship row, the fifth interval relationship row comprising a vertical listing of root notes in interval relationship for a fifth chord. In certain embodiments, each row in the first interval relationship row, the second interval relationship row, the third interval relationship row, the fourth interval relationship row, and the fifth interval relationship row includes a root note marker aligned horizontally across from a corresponding alphabetic designator in the root note row. In some embodiments, the musical instrument is a guitar, and the sound producing elements are guitar strings. In some embodiments, the root note row, the first interval relationship row, the second interval relationship row, the third interval relationship row, the fourth interval relationship row, and the fifth interval relationship row are printed on a 2-dimensional label. In certain embodiment, the chord decoder device comprises a 3-dimensioal body, and wherein the root note row, the first interval relationship row, the second interval relationship row, the third interval relationship row, the fourth interval relationship row, and the fifth interval relationship row are displayed on the 3-dimensional body, such that the fifth interval relationship row is situated between the fourth interval relationship row and the root note row. In some embodiments, the 3-dimentional body is a hexagonal prism. In certain embodiments, the 3-dimensional body includes top and bottom end caps. In some embodiments, the decoder device further comprises a magnetic element on at least one of the top and bottom end caps.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
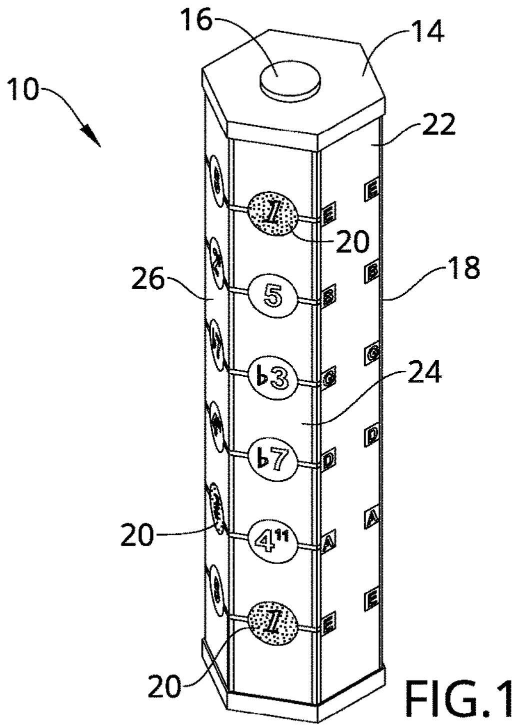
FIG. 1 is a perspective view of a guitar chord decoder device in accordance with certain embodiments.
Figure 2:
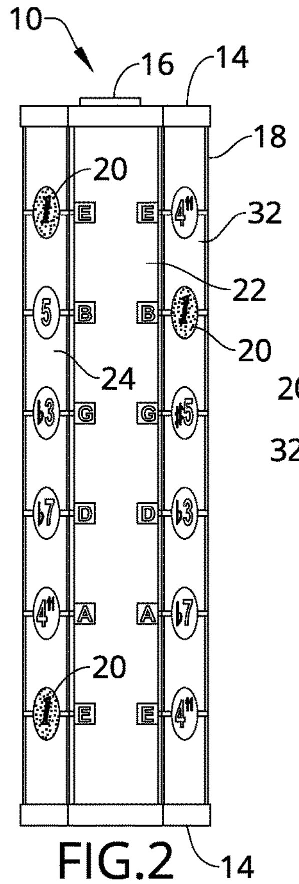
FIG. 2 is a right-side view of the decoder device.
Figure 3:
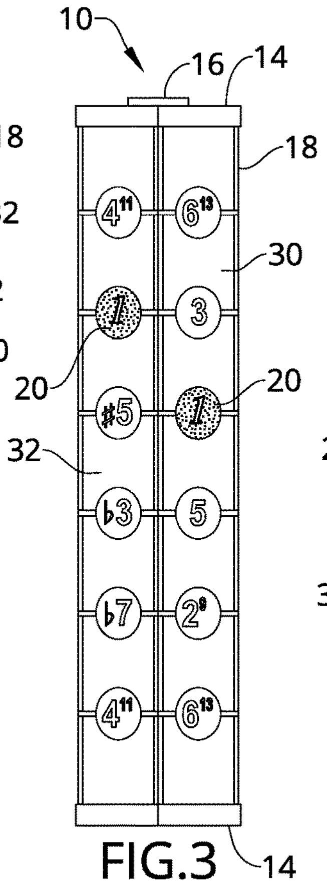
FIG. 3 is a rear view of the decoder device.
Figure 4:
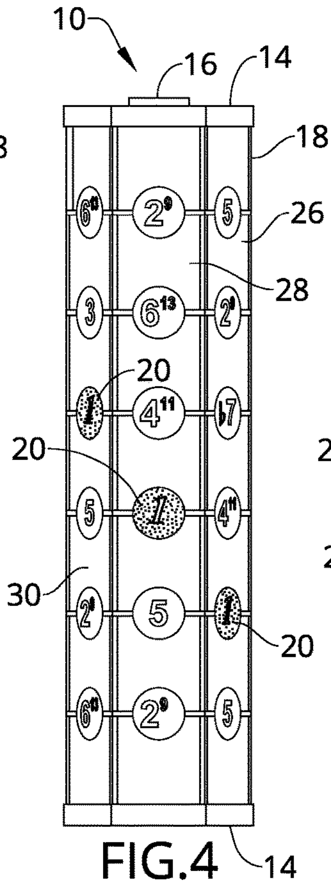
FIG. 4 is a left side view of the decoder device.
Figure 5:
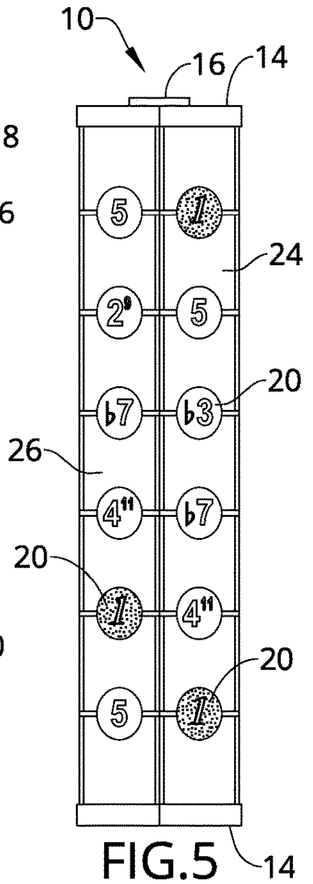
FIG. 5 is a front view of the decoder device.
Figure 6:
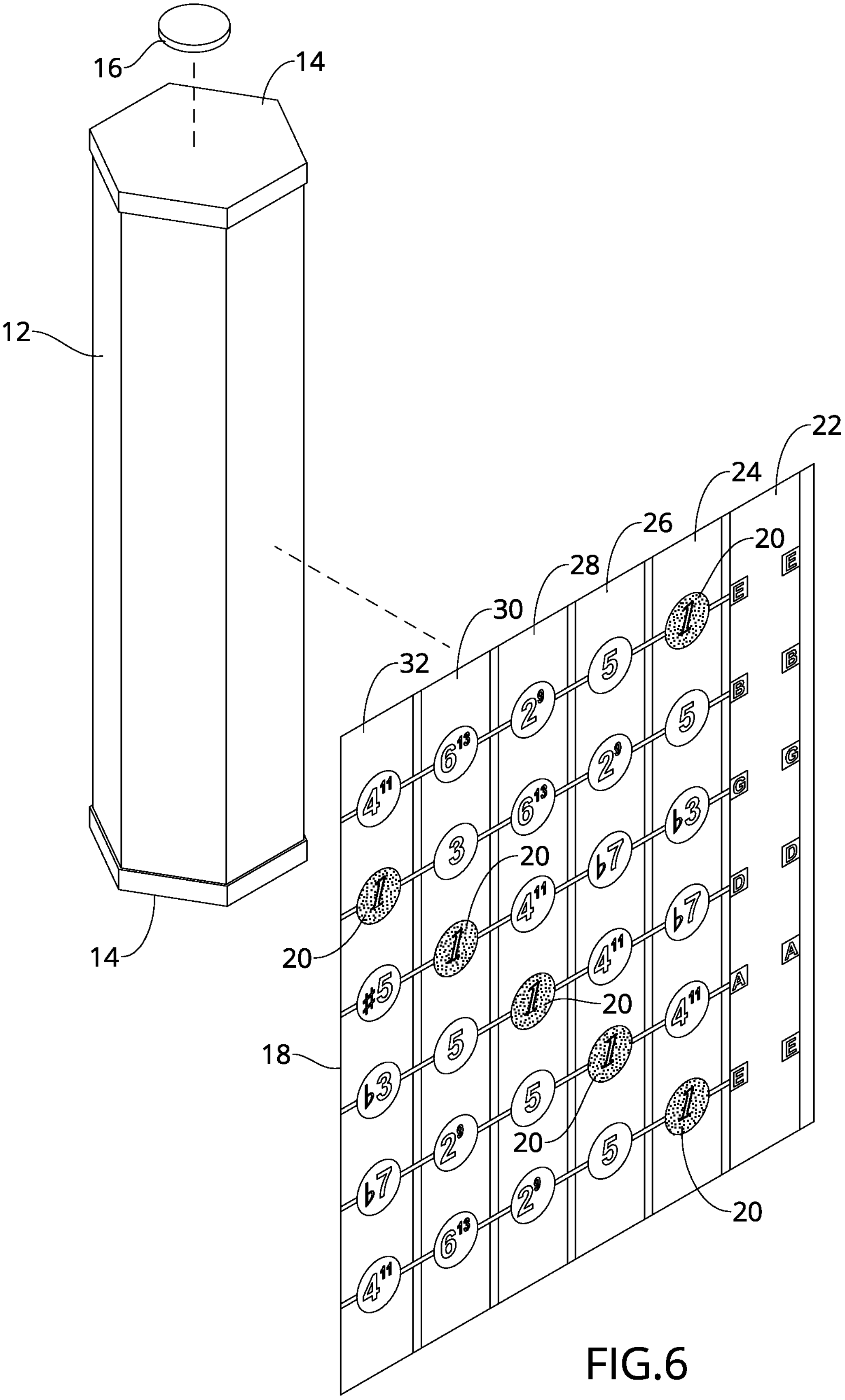
FIG. 6 is an exploded view of the decoder device.

According to various embodiments as depicted in FIGS. 1-8, disclosed is a chord decoder system including a chord decoder device 10 and method 700 for assisting users in playing musical instruments such guitars and/or learning note combinations that make up chords.

In embodiments as depicted in FIGS. 1-6, device 10 comprises a display of notes, including indications for root notes, which are arranged in a compact manner that assist the user in understanding and creating chords through intervals. In certain embodiments, the display of notes may be arranged on a unified chart which may be supported on a 3 dimensional device. In further embodiments, the chord decoder system may also comprise chord formula chart(s), which may be used in conjunction with device 10 to identify root notes associated with specific chords. In further embodiments, the disclosed system may provide workbook (s) and practice sheets designed to help a user learn to expand the use of intervals vertically and horizontally on the guitar neck.

In certain embodiments, device 10 may comprise a hexagonal prism body 12, on which the notes are displayed, as shown in the figures. In some embodiments, the notes may be provided on a sticker and/or label 18 attached to hexagonal body 12; however other methods, such as engraving, etching, direct printing, raised printing, etc., may be employed in alternate embodiments. In further embodiments, device 10 may include end caps 14 on the top and bottom ends of hexagonal body 12, but not necessarily so. According to an exemplary embodiment, device 10 may be about 6 inches long. Hexagonal body 12 and end caps 14 may be made of plastic with label 18 comprising one or more decals. It shall be appreciated however, that different materials or combinations of materials may be used in alternate embodiments, and that device 10 may be of any size and dimensions.

Figure 8:
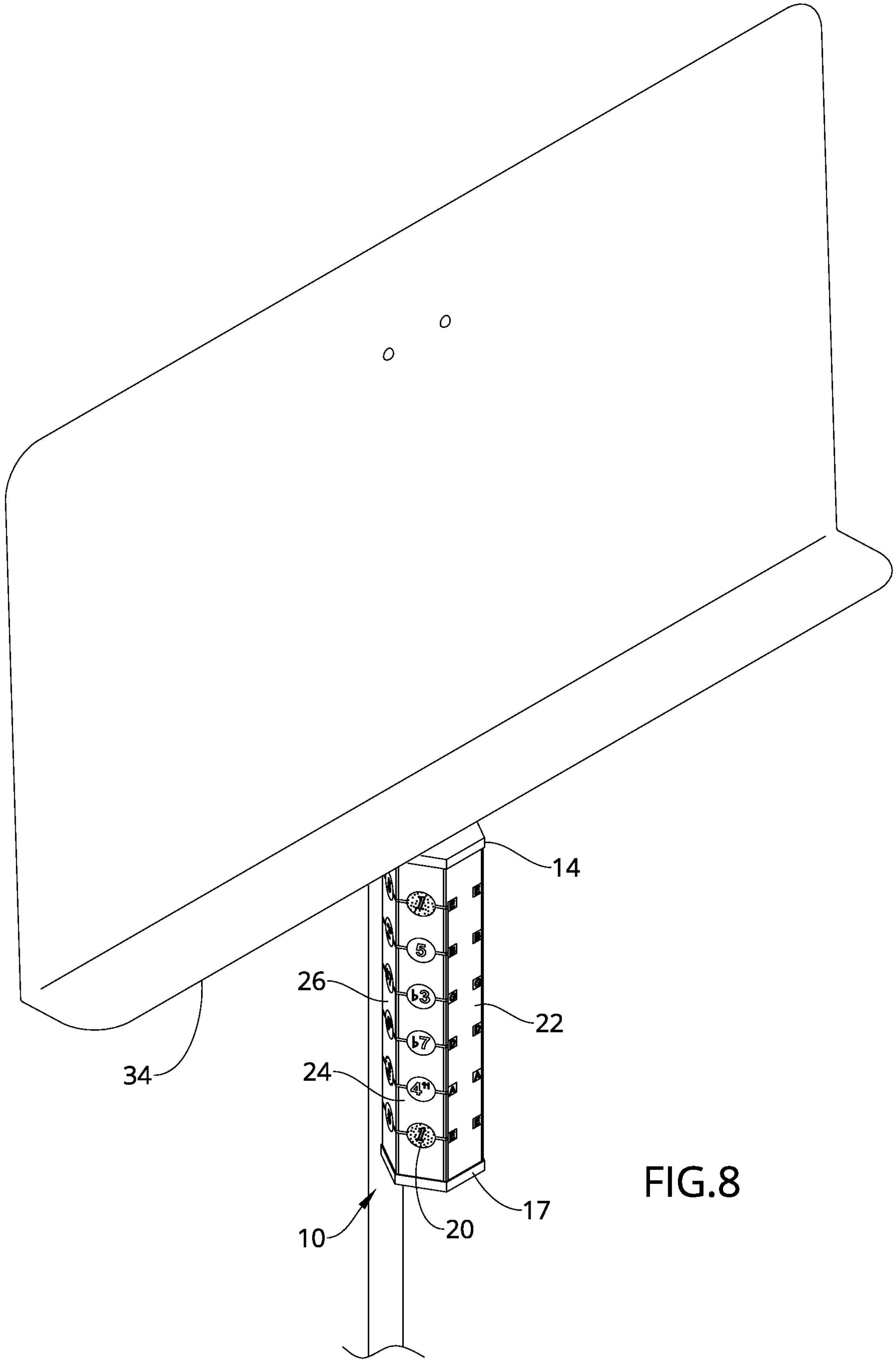
FIG. 8 is a perspective view of the decoder device, shown attached to a music stand.

In some embodiments, device 10 may include an attachment element configured to attach device 10 to a support member such as a music stand 34 (see FIG. 8). In one embodiment, device 10 may include a magnet 16 on the top end cap 14, for attachment to a metallic music stand. It shall be appreciated that other attachment devices which are known in the art, such as clamps, brackets, clips, and the like may be used in alternate embodiments. In some alternate embodiments, a support member such as a weighted platform may be provided on the bottom end cap, to allow device 10 to be supported on a surface such as a table.

In some embodiments, device 10 may be configured for use with a typical 6-string guitar, including strings E, A, D, G, B, and E, which make up the root notes, and may list all vertical intervals on the guitar neck associated with each root note. In certain embodiments, device 10 includes a vertical row 22 of alphabetic designators for the 6 root notes. Device 10 further comprises five vertical rows of interval relationships of the root notes for specific chords, including include a first vertical interval relationship row 24 adjacent vertical row 22; a second vertical interval relationship row 26 adjacent vertical row 24, opposite row 22; a third vertical interval relationship row 28 adjacent row 26, opposite row 24; a fourth vertical interval relationship row 30 adjacent row 28, opposite row 26; and a fifth vertical interval relationship row 32, between rows 30 and 22. Additionally, a root note markers 20 (designated by the number "1") appears in each of rows 24, 26, 28, 30, and 32, horizontally across from its associated root note in row 22. As such, device 10 includes 6 vertical rows and 6 horizontal rows.

Figure 7:
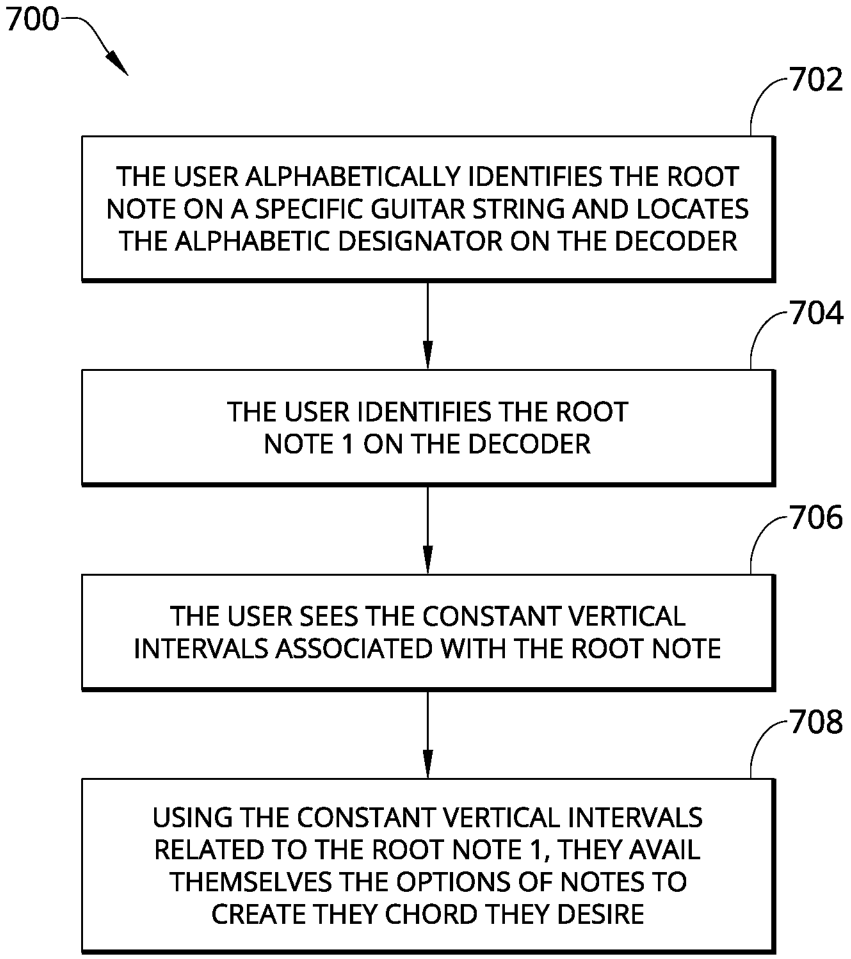
FIG. 7 is a flow chart for a method of using the decoder device.

As best depicted in FIG. 7, a method 700 of using device 10 may comprise an initial step of identifying a root note in which the user wishes to build a chord, and locating the alphabetic designator within vertical row 22. In cases where a user may lack knowledge, chord formula chart(s) or other information source (e.g., online, app) may be used to identify an interval relationship, and hence a root note associated with the chord. Method 700 may further comprise a subsequent step 704 of locating the vertical row associated with the alphabetic designator. This may comprise following the horizontal row associated with the alphabetic designator to the root note marker 20 (i.e., root note 1). This takes the user to one of vertical rows 24, 26, 28, 30, or 32, which lists the constant vertical intervals associated with the root note (step 706), and allows the user to view the options of notes which may be used to create the desired chord (step 708). In certain embodiments, device 10 may be magnetically attached to the bottom of a metal or wooden music stand and easily rotated to the specific string of where the user wants to build a chord.

In one example, a user interested in a specific chord (e.g., a C Major chord), may refer to a chord formula chart to determine the root note and/or interval relationship of the chord. In case of a C major, the interval relationship would consist of a 1 3 5 interval relationship. The user would then identify a C note anywhere on the guitar. If, for example, the user chose the C note on the G string (3rd string/5th fret), he/she would turn the decoder to the 1 located across from the G. The user would then see all of the vertical interval relationships for the C note in a vertical column, i.e., 6-2-5-1-3-6 as shown in row 30. The three notes needed to create a C chord (i.e., 5-1-3) would be shown stacked. This would indicate to the user that the other intervals can be disregarded, and the chord can now be played simply with the user's index finger.

As such, device 10 provides a visual aid, which may be designed in hexagonal form, to provide a compact grouping of root notes that make up chords, and may be rotated to specific interval locations for identification of different chords. In certain embodiments, the disclosed system may include written material, such as workbooks, and practice sheets, which may also support the user in learning interval relationships in conjunction with device 10. Such written material may be used to reinforce the teaching that the interval relationship stays exactly the same for any named chord for all (12 keys) as interval relationships, not alphabetical names, are used to create the chord. This allows a user to avoid double flats or double sharps in chord building, as strictly numeric interval relationships are built around the 1 or Root note. The user may then use the system workbook and practice sheets to learn to expand the use of intervals vertically and horizontally on the guitar neck. Simple to very complex chords covering all keys (i.e., 12 keys) can be created through understanding the vertical relationship of notes built around the 1 or Root note.

As such, the disclosed system including decoder unit helps a user to understand chord creation and/or visualize the vertical intervals on the guitar neck. This enables the user to create both simple and complex chords based on the root note anywhere on the neck of the guitar without referring to a book or chart. It shall be appreciated that the disclosed system can have multiple configurations in different embodiments, and may be applied to different musical instruments in alternate embodiments. It shall be appreciated that decoder device 10 is not necessarily limited to a hexagonal and/or symmetrical tube, but may be a tube of any number of sides. In some alternate embodiments, decoder device 10 may comprise a cylindrical tube. In some alternate embodiments, the decode device may comprise a 2-dimentional item, such as label 18. It shall be appreciated that the decoder device may comprise any alternative known materials in the field and be of any size and/or dimensions. It shall be appreciated that the components of the decoder unit described herein may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for assisting a user in identifying and/or creating chords for a musical instrument, the musical instrument including multiple sound producing elements which are each associated with a root note, the system comprising:

a chord decoder device for identifying and/or creating said chords for said musical instrument, the chord decoder device comprising:

a three-dimensional elongated body configured as a hexagonal prism extending along a longitudinal axis and having a hexagonal cross-sectional profile in a plane transverse to the longitudinal axis, the hexagonal prism supporting at least six longitudinal rows positioned adjacent one another on an outer surface of the hexagonal prism, the six longitudinal rows comprising:

at least one root note row including a longitudinally aligned listing of alphabetic designators, wherein each of the alphabetic designators represents a root note associated with a different one of the multiple sound producing elements, a first interval relationship row disposed adjacent to a first side of the at least one root note row, the first vertical interval relationship row comprising a longitudinally aligned listing of root notes in interval relationship for a first chord, wherein each of the root notes in the first interval relationship row is laterally aligned with an associated alphabetic designator in the at least one root note row;

a second interval relationship row disposed adjacent to a first side of the first interval relationship row, the second interval relationship row comprising a longitudinally aligned listing of root notes in interval relationship for a second chord, wherein each of the root notes in the second interval relationship row is laterally aligned with an associated root note in the first interval relationship row, the first interval relationship row being disposed between the at least one root note row and the second interval relationship row;

a third interval relationship row disposed adjacent to a first side of the second interval relationship row, the third interval relationship row comprising a longitudinally aligned listing of root notes in interval relationship for a third chord wherein each of the root notes in the third interval relationship row is laterally aligned with an associated root note in the second interval relationship row, the second interval relationship row being disposed between the first interval relationship row and the third interval relationship row;

a fourth interval relationship row disposed adjacent to a first side of the third interval relationship row, the fourth interval relationship row comprising a longitudinally aligned listing of root notes in interval relationship for a fourth chord wherein each of the root notes in the fourth interval relationship row is laterally aligned with an associated root note in the third interval relationship row, the third interval relationship row being disposed between the second interval relationship row and the fourth interval relationship row; and a fifth interval relationship row disposed adjacent to a first side of the fourth interval relationship row, the fifth interval relationship row comprising a longitudinally aligned listing of root notes in interval relationship for a fifth chord wherein each of the root notes in the fifth interval relationship row is laterally aligned with an associated root note in the fourth interval relationship row, and wherein each of the root notes in the fifth interval relationship row is laterally aligned with an associated alphabetic designator in the at least one root note row, the fourth interval relationship row being disposed between the third interval relationship row and the fifth interval relationship row, and the fifth interval relationship row being disposed between the fourth interval relationship row and the at least one root note row; and the chord decoder device further comprising a top end cap and a bottom end cap, and a magnetic element disposed on at least one of the top end cap and the bottom end cap, the magnetic element being configured to attach the chord decoder device to a metallic music stand and to permit rotation of the chord decoder device relative to the music stand to which it is attached.

2. The system of claim 1, wherein each row in the first interval relationship row, the second interval relationship row, the third interval relationship row, the fourth interval relationship row, and the fifth interval relationship row includes a prominent root note marker aligned horizontally across from a corresponding alphabetic designator in the root note row.

3. The system of claim 2, further comprising a guitar, the sound producing elements being guitar strings.

4. The system of claim 3, wherein the root note row, the first interval relationship row, the second interval relationship row, the third interval relationship row, the fourth interval relationship row, and the fifth interval relationship row are printed on a 2-dimensional label.

5. The system of claim 1, wherein each longitudinal row of the at least six longitudinal rows includes at least 6 longitudinally aligned listed items.

6. The system of claim 2, wherein the prominent root note marker is indicated by the number 1.

7. The system of claim 1, wherein the hexagonal prism includes six longitudinal faces, and wherein the first interval relationship row is disposed on a first face of the six longitudinal faces, the second interval relationship row is disposed on a second face of the six longitudinal faces, the second face being adjacent the first face, the third interval relationship row being disposed on a third face of the six longitudinal faces, the third face being adjacent the second face, the fourth interval relationship row being disposed on a fourth face of the six longitudinal faces, the fourth face being adjacent the third face, the fifth interval relationship row being disposed on a fifth face of the six longitudinal faces, the fifth face being adjacent the fourth face, and a sixth face of the six longitudinal faces being adjacent the fifth face and the first face.

* * * * *